United States Patent [19]

Coleman

[11] 4,190,234
[45] Feb. 26, 1980

[54] MULTIPLE WIRE FENCE TIGHTENER

[76] Inventor: Cecil L. Coleman, Rte. 1, Box 246, Dardanelle, Ark. 72834

[21] Appl. No.: 911,899

[22] Filed: Oct. 24, 1978

[51] Int. Cl.² .............................................. B66F 3/00
[52] U.S. Cl. .................................................... 254/83
[58] Field of Search ................................... 254/83, 67

[56] References Cited

U.S. PATENT DOCUMENTS

| | | | |
|---|---|---|---|
| 1,031,115 | 7/1912 | Hanson | 254/83 |
| 1,115,993 | 11/1914 | Whitcher | 254/83 |
| 1,965,899 | 7/1934 | Lambert | 254/83 |
| 3,146,993 | 9/1964 | Kelsey | 254/83 |

*Primary Examiner*—Robert C. Watson
*Attorney, Agent, or Firm*—Stephen D. Carver

[57] ABSTRACT

A stretcher apparatus for tightening multiple wire fences. The apparatus preferably comprises a pair of spaced apart, vertically parallel pulling angle members, a pair of horizontally disposed, rotatable adjusting rods extending between the pulling members and threadably coupled thereto, and a plurality of eye bolts secured in vertically spaced apart relation to each pulling angle member and adapted to be attached to the individual wire elements of a fence to be tightened. The pulling rods each comprise a central turnbuckle to which first and second threaded segments are weldably secured. Each turnbuckle is fastened to lefthand and righthand threaded segments threadably received by opposite pulling angle members. Rotation of the turnbuckles draws the fence elements together. Elongated reinforcement members are rigidly secured to the pulling angle members between the first and second adjusting rods to prevent deformation of the pulling angle members when the apparatus is operated.

1 Claim, 5 Drawing Figures

MULTIPLE WIRE FENCE TIGHTENER

BACKGROUND OF THE INVENTION

This invention relates to fence tightening apparatus. More particularly, the present invention relates to apparatus adapted for manually tightening multiple wire fences such as barbed wire fences and the like.

In the prior art a variety of wire stretching devices have been employed for tightening fences. One problem with prior art devices is that often more than one operator is required. Moreover, prior art devices known to applicant which have heretofore been employed for tightening multiple wire fences, such as conventional barbed wire fences and the like, often become twisted or unwieldly in response to the severe pressures encountered during the tightening operation. Moreover, some prior art wire stretchers depend upon the rotation or actuation of a plurality of moving parts which are often dfficult to simultaneously adjust as the farmer or rancher installs his fencing. As will be recognized by those skilled in the art, it is very important to properly tighten barbed wire fences, for example, in order to prevent unwanted escape of range animals.

SUMMARY OF THE INVENTION

The present invention comprises a fence tightener adapted to properly stretch multiple elements in fences comprised of a plurality of independently strung, parallel wires.

To this effect the present invention comprises a pair of vertically disposed, rigid pulling angle members comprised of angle iron or the like. A plurality of eyebolts are vertically disposed along the length of the pulling angle members in spaced apart relation for quick attachment to the individual wire elements of a fence to be tightened. First and second adjusting rod members threadably received by the pulling angle members and horizontally disposed therebetween may be tightened to draw the pulling angle members together, thus tightening the fence.

Each adjusting rod preferably comprises a centrally disposed turnbuckle portion to which oppositely threaded segments are weldably attached. Each segment is threadably received by a bolt rigidly secured within the apex of the appropriate pulling angle member. As the turnbbuckle portion is therefore rotated, as by the insertion of a screwdriver or the like, the pulling angle members will be drawn together thereby tightening the individual fence wire elements. Importantly, because of the construction of the bolt means welded within a symmetrical position inside the pulling angle member apex, twisting or deformation of the pulling angle members will be prevented. To this effect reinforcement means are also included centrally along the pulling angle members thereby further resisting structured deformation as the apparatus is tightened.

Therefore, an object of this invention is to provide a fence tightener of the character described which is adapted to function expediently and simply. Another object of this invention is to provide a fence tightener of the character described which may be conveniently operated by a single user.

Still another object of this invention is to provide a fence tightener apparatus which may be employed with wire fences characterized by a plurality of individually strung parallel, horizontally oriented wire elements.

Still another object of this invention is to provide a fence tightener apparatus which may be employed with wire fences characterized by a plurality of individually strung parallel, horizontally oriented wire elements.

Still another object of this invention is to provide a fence tightener of the character described which may be tightened in operation without worrying about twisting or deformation of the structural members coupled to the fence wire elements.

A still further object of this invention is to provide a fence tightener of the character described which will remain substantially stable in the event of breakage of an individual wire element and prevent the injury of the operator.

These and other objects and advantages of this invention, along with features of novelty appurtenant thereto, will appear or become apparent in the course of the following description.

BRIEF DESCRIPTION OF THE DRAWINGS

In the following drawings, which form a part of the specifications and which are to be construed in conjunction therewith, and in which like reference numerals have been employed throughout to indicate like parts in the various views.

DETAILED DESCRIPTION OF THE INVENTION

Figure 1:
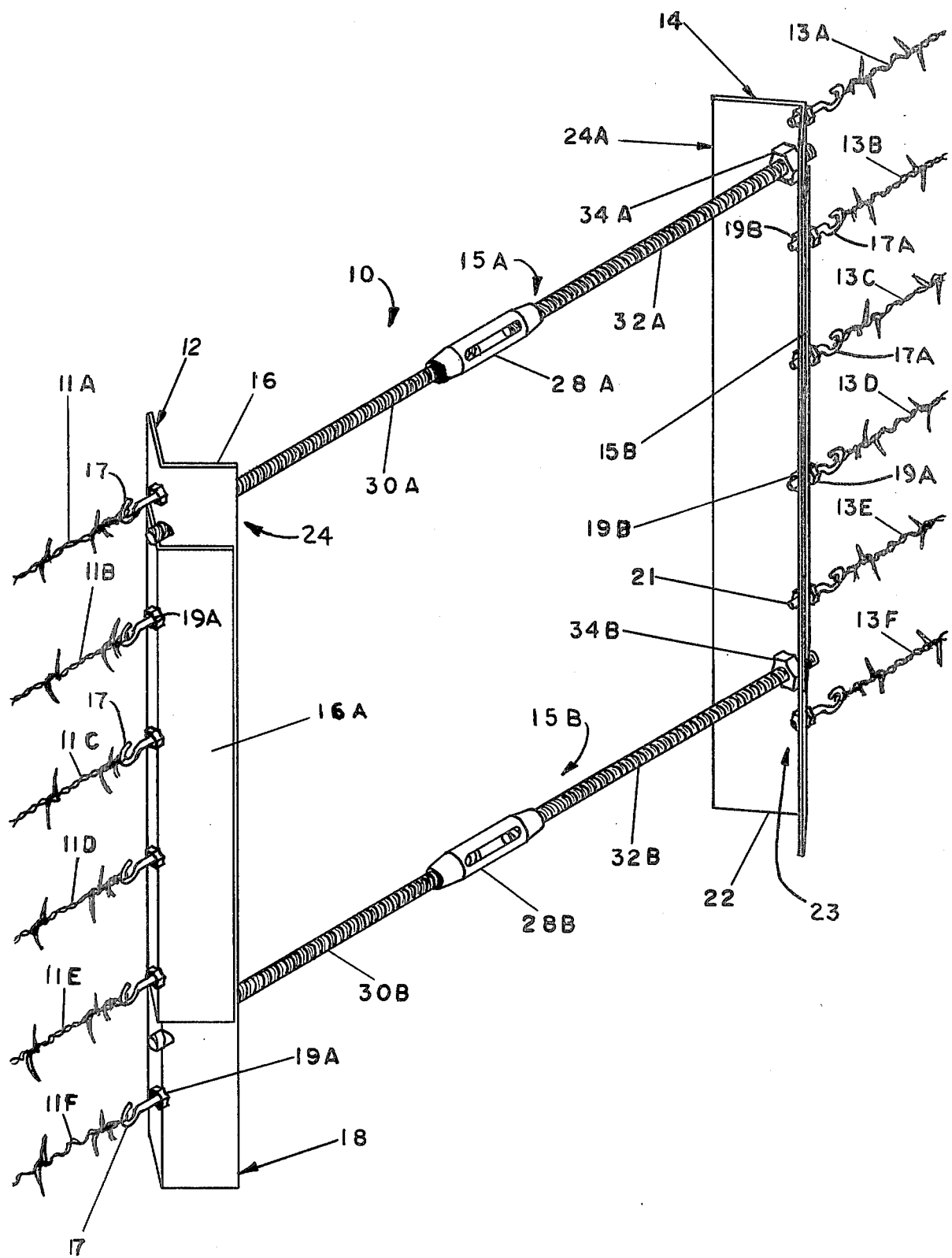
FIG. 1 is a perspective view of the invention illustrated in a position in which a fence is about to be tightened.
Figure 2:
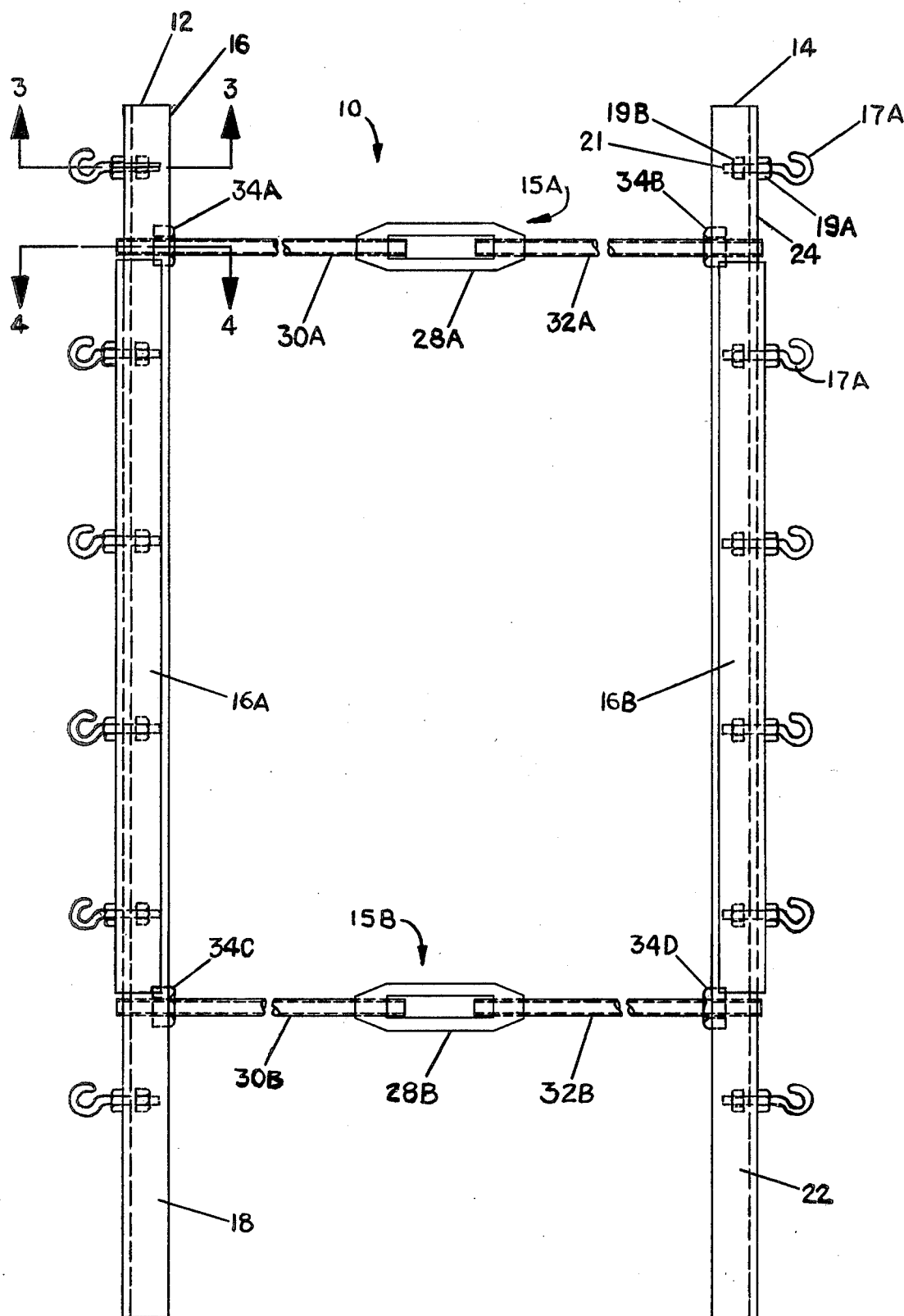
FIG. 2 is a front plan view of the invention with parts thereof broken away or shown in section for clarity.
Figure 3:
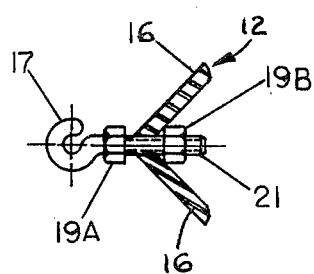
FIG. 3 is a sectional view illustrating preferred eyelet construction taken generally through line 3—3 in FIG. 2.

With initial reference to FIG. 1, thereshown is a multiple wire fence stretcher 10 constructed in accordance with the teaching of this invention. Apparatus 10 preferably comprises a pair of oppositely positioned, vertically disposed rigid pulling angle member 12 and 14 which are preferably comprised of rigid angle steel or the like. As illustrated, a plurality of individual fence wire elements 11A through 11F are attached to the eyelets 17 which are vertically spaced apart and rigidly secured to pulling angle member 12. Similarly, fence wire elements 13A through 13F on the opposite side are secured to eyelets 17A which are threadably secured to the pulling angle member 14 in a similar fashion. It will be appreciated that each of the eyelets 17, 17A are preferably threadably secured at the apex of each pulling angle member 12, 14 through a pair of oppositely disposed nuts 19A, 19B secured at inner and outer locations with respect to the pulling angle members 12, 14 (FIG. 3).

Figure 4:
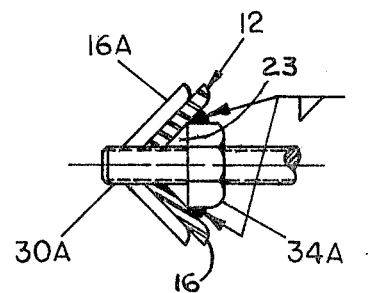
FIG. 4 is a sectional view illustrating the preferred placement of the bolt means which threadably receives the adjusting rods, taken generally through line 4—4 in FIG. 2.

First adjusting rod member 15A extends horizontally between the top portions 24, 24A of the pulling angle members 12 and 14. A second, or lower, pulling angle member 15B extends generally horizontally between the bottom portions 18 and 22 of the pulling angle members 12 and 14. The adjusting rods 15A, 15B comprise centrally disposed turnbuckle portions 28A, 28B respectively which are prefereably weldably secured to oppositely threaded elongated threaded segments 30A, 32A and 30B, 32B respectively. The threaded segments are received within suitable bolts 34A, 34B which are weldably secured within the apex region 23 within the elongated pulling angle members (FIG. 4). It will be observed that threaded segment portions 30A, 30B are threaded oppositely from companion portions 32A, 32B such that rotation of the turnbuckle portions 28A, 28B draws the pulling angle members 12, 14 toward each other. As rotation of the adjusting rod members 15A, 15B occurs, it will be observed (FIG. 5) that the outer ends of the threaded segments project outwardly from the two pulling angle members 12, 14 which move toward the centrally disposed turnbuckle portions 28A, 28B.

As will be appreciated by those skilled in the arts, the structural forces thus encountered by the pulling angle members 12, 14 may tend to bend some, particularly where fence elements are not as numerous as illustrated. Accordingly, rigid centrally disposed reinforcing angle member portions 16A, 16B are preferably weldably secured at a central position on pulling members 12, 14 between the tops and bottoms thereof. Those of eyelets 17 disposed centrally along pulling members 12, 14 are additionally received through reinforcement members 16A, 16B.

Figure 5:
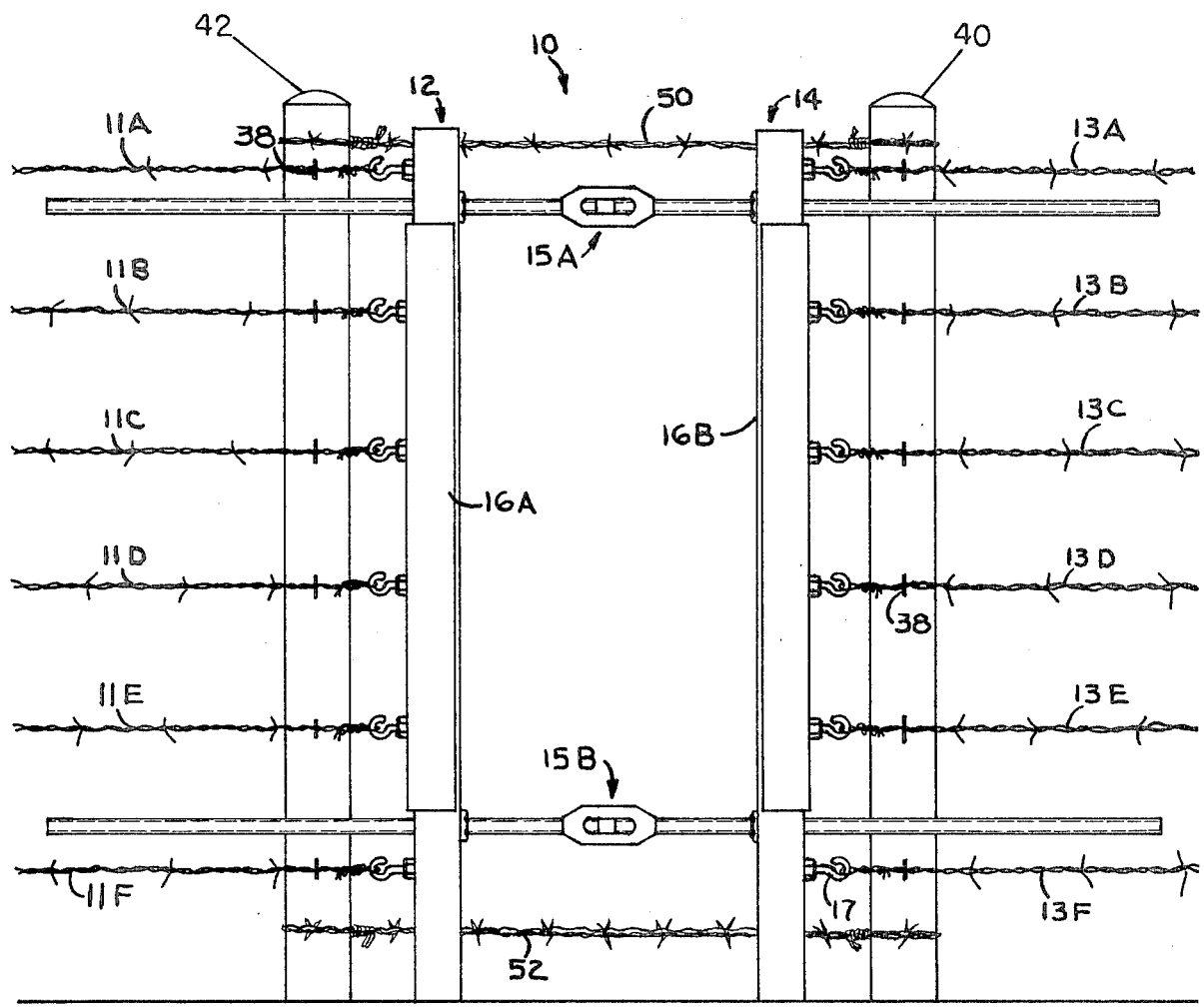
FIG. 5 is a plan view of the invention shown with the fence appropriately tightened, and illustrating means whereby the fence is secured with respect to the fence posts.

As best illustrated in FIG. 5, when the pulling rods 15A and 15B are moved to a position where the fence elements are appropriately tightened, the individual fence elements are then fastened to adjacent fence posts 40, 42 via tacks or staples 38. Loops of wire 50, 52 are preferably wound around the posts 40, 42 to maintain fence pressure once the tightener is relaxed. Afterwards, the apparatus 10 may be removed simply by rotating pulling rods 15A and 15B in opposite directions to loosen the apparatus.

From the foregoing, it will be seen that this invention is one well adapted to attain all the ends and objects herein set forth, together with other advantages which are obvious and which are inherent to the structure.

It will be understood that certain features and sub-combinations are of utility and may be employed without reference to other features and sub-combinations. This is contemplated by and is within the scope of the claims.

As many possible embodiments may be made of the invention without departing from the scope thereof, it is to be understood that matter herein set forth or shown in the accompanying drawings is to be interpreted as illustrative and not in a limiting sense.

What is claimed is:

1. A multiple wire stretcher for tightening fences, said stretcher comprising:
    first and second elongated, rigid pulling angle members adapted to be disposed in parallel, spaced apart relation said pulling angle members each having top and bottom portions; said angle members comprising angled elongated reinforcement members rigidly coupled thereto and extending between said pulling angle member top and bottom portions for preventing deformation of said pulling angle members during operation of said wire stretcher;
    a first adjusting rod adapted to extend between said pulling angle member top portions, said first adjusting rod threadably coupled to each said pulling angle members whereby rotation of said rod draws said pulling angle members together;
    a second adjusting rod adapted to extend between said pulling angle member bottom portions, said second adjusting rod threadably coupled to said pulling angle members whereby rotation of said second adjusting rod draws said pulling angle members together;
    said first and second adjusting rods each comprising:
        a centrally disposed turnbuckle portion adapted to be manually rotated to operate said wire stretcher;
        an elongated, lefthand threaded segment weldably secured to said turnbuckle portion and threadably received within one of said first and second pulling angle members; and
        an elongated, righthand threaded segment weldably secured to an opposite side of said turnbuckle portion and threadably received within the other of said first and second pulling angle members;
    said pulling angle members additionally comprising apex portions thereof comprising nut means weldably secured thereto at a central, symmetrical position for threadably receiving said lefthanded and right-handed threaded adjusting rod segments, thereby preventing twisting of said elongated pulling angle members in response to rotation of said adjusting rods; and
    a plurality of eye bolts adapted to be coupled to individual wire elements of said fence and secured to said pulling angle members in spaced apart relationship thereon.

* * * * *